(12) United States Patent
Edmondson

(10) Patent No.: US 12,022,375 B2
(45) Date of Patent: Jun. 25, 2024

(54) END OF TRAIN TO HEAD OF TRAIN COMMUNICATION OVER A TRAIN CONTROL NETWORK

(71) Applicant: Meteorcomm, LLC, Renton, WA (US)

(72) Inventor: Derek Edmondson, Tacoma, WA (US)

(73) Assignee: Meteorcomm, LLC, Renton, WA (US)

( * ) Notice: Subject to any disclaimer, the term of this patent is extended or adjusted under 35 U.S.C. 154(b) by 367 days.

(21) Appl. No.: 17/556,076

(22) Filed: Dec. 20, 2021

(65) Prior Publication Data

US 2022/0201587 A1 Jun. 23, 2022

Related U.S. Application Data

(60) Provisional application No. 63/128,096, filed on Dec. 19, 2020.

(51) Int. Cl.
| | |
|---|---|
| *H04W 40/24* | (2009.01) |
| *B61L 15/00* | (2006.01) |
| *B61L 27/70* | (2022.01) |
| *H04L 45/00* | (2022.01) |
| *H04L 45/021* | (2022.01) |
| *H04W 40/12* | (2009.01) |

(52) U.S. Cl.
CPC ........... *H04W 40/24* (2013.01); *H04L 45/021* (2013.01); *H04L 45/54* (2013.01); *H04W 40/12* (2013.01); *B61L 27/70* (2022.01)

(58) Field of Classification Search
CPC .... H04W 40/24; H04W 40/12; H04L 45/021; H04L 45/54; B61L 27/70; B61L 15/0054
See application file for complete search history.

(56) References Cited

U.S. PATENT DOCUMENTS

| 568,101 A | 9/1896 | Rouse |
|---|---|---|
| 4,582,280 A | 4/1986 | Nichols |
| 4,736,371 A | 4/1988 | Tejima |
| (Continued) | | |

FOREIGN PATENT DOCUMENTS

| CN | 101345726 A | 1/2009 |
|---|---|---|
| WO | 2010059312 | 5/2010 |
| WO | 2010059312 A1 | 5/2010 |

OTHER PUBLICATIONS

AAR Manual of Standards and Recommended Practices Office Architecture and Railroad Electronics Messaging, Class C IMessaging, Standard S-9355.V1.0, Aug. 2014, 4 pages.

(Continued)

*Primary Examiner* — Harry H Kim
(74) *Attorney, Agent, or Firm* — Hubbard Law, PLLC

(57) ABSTRACT

A wireless train control network is adapted for forwarding data between a remote radio in an EOT unit and remote radio at the head of train using the base stations of the wireless train control network. A base station's current table of base station radios and remote radios that it hears or has a connection is distributed to neighboring base stations by a routing information exchange application. Tables are sent to and received from the application using a messaging service of the wireless train control network. A base station builds from the tables of neighboring base stations a route to a remote radio to which it is not connected, and forwards wireless data packets received for it by transmitting it to another base station radio.

21 Claims, 4 Drawing Sheets

(56) References Cited

U.S. PATENT DOCUMENTS

| | | | |
|---|---|---|---|
| 5,039,038 A | 8/1991 | Nichols | |
| 5,065,398 A | 11/1991 | Takashima | |
| 5,267,473 A | 12/1993 | Bezos | |
| 5,377,938 A | 1/1995 | Bezos | |
| 5,681,015 A | 10/1997 | Kull | |
| 5,720,455 A | 2/1998 | Kull | |
| 5,757,291 A | 5/1998 | Kull | |
| 6,072,993 A | 6/2000 | Trikha | |
| 6,115,435 A | 9/2000 | Harada | |
| 6,212,173 B1* | 4/2001 | Lindsay | H04W 52/40 370/331 |
| 6,269,116 B1 | 7/2001 | Javerbring | |
| 6,310,893 B1* | 10/2001 | Yuan | H04B 7/18582 370/476 |
| 6,505,104 B2 | 1/2003 | Collins | |
| 6,577,610 B1 | 6/2003 | Kronz | |
| 7,042,954 B2 | 5/2006 | Ha | |
| 7,467,032 B2 | 12/2008 | Kane | |
| 7,742,850 B2 | 6/2010 | Kane | |
| 8,098,645 B2 | 1/2012 | Yee | |
| 8,279,796 B1 | 10/2012 | Cleveland | |
| 8,320,301 B2* | 11/2012 | Walton | H04L 25/0204 375/276 |
| 8,340,056 B2 | 12/2012 | Siriwongpairat | |
| 8,582,694 B2 | 11/2013 | Velazquez | |
| 8,593,932 B2* | 11/2013 | Laroia | H04L 5/023 375/242 |
| 8,602,574 B1 | 12/2013 | Alvi | |
| 8,798,821 B2* | 8/2014 | Kraeling | B60T 13/665 701/19 |
| 8,914,170 B2* | 12/2014 | Kraeling | H04L 12/4633 701/19 |
| 9,037,625 B2 | 5/2015 | Sturza | |
| 9,112,735 B1 | 8/2015 | Harris | |
| 9,379,576 B2 | 6/2016 | Al Jaeedi | |
| 9,398,587 B1 | 7/2016 | Kong | |
| 9,402,250 B2* | 7/2016 | Stanwood | H04W 72/30 |
| 9,450,688 B1 | 9/2016 | Murphy | |
| 9,591,639 B2* | 3/2017 | Zimmerman | H04W 72/23 |
| 9,669,850 B2 | 6/2017 | Fuchs | |
| 10,091,785 B2 | 10/2018 | Hu | |
| 10,160,466 B1 | 12/2018 | Potter | |
| 10,710,620 B2 | 7/2020 | Potter | |
| 2003/0103589 A1 | 6/2003 | Nohara | |
| 2004/0001561 A1 | 1/2004 | Dent | |
| 2005/0149339 A1 | 7/2005 | Tanaka | |
| 2007/0170314 A1 | 7/2007 | Kane | |
| 2007/0236079 A1 | 10/2007 | Kull | |
| 2009/0074101 A1 | 3/2009 | Tang | |
| 2009/0310548 A1 | 12/2009 | Kwon | |
| 2010/0020235 A1 | 1/2010 | Bouillet | |
| 2010/0097952 A1 | 4/2010 | McHenry | |
| 2010/0130124 A1 | 5/2010 | Teeter | |
| 2012/0246692 A1 | 9/2012 | Ghosh | |
| 2013/0136075 A1 | 5/2013 | Yu | |
| 2013/0294356 A1 | 11/2013 | Bala | |
| 2015/0111595 A1 | 4/2015 | Yoo | |
| 2015/0215986 A1* | 7/2015 | Lei | H04W 76/19 370/329 |
| 2017/0088153 A1* | 3/2017 | Fernandes | B61L 15/009 |
| 2017/0369086 A1* | 12/2017 | Sleasman | B61L 27/70 |
| 2018/0019831 A1 | 1/2018 | Zhang | |
| 2020/0207388 A1* | 7/2020 | Halowell | B61L 15/0054 |
| 2022/0006601 A1 | 1/2022 | Zhu | |

OTHER PUBLICATIONS

AAR Manual of Standards and Recommended Practices Office Architecture and Railroad Electronics Messaging, Class D Messaging, Standard S-9356.V1.0, 2010, 34 pages.

AAR Manual of Standards and Recommended Practices Office Architecture and Railroad Electronics Messaging, Edge Message Protocol, Standard S-9354.V2.0, Implemented Oct. 2018, 18 pages.

Fatih Genc et al., "On the Optimum Ring Ratio Determination for 16-DAPSK Modulation in OFDM Systems", 2014 EEE 22nd Signal Processing and Communications Applications Conference (SIU 2014), 4 pages.

Fredric J. Harris et al.; "Digital Receivers and Transmitters Using Polyphase Filter Banks for Wireless Communications"; IEEE Transactions on Microwave Theory and Techniques; vol. 51, No. 4; Apr. 2003; pp. 1395-1412; DOI: 10.1109/TMTT.2003.809176.

Hewavithana et al., "Soft Decisions for DQPSK Demodulation for the Viterbi Decoding of the Convolutional Codes", ICASSP 2003, 4 pages.

Meteorcomm LLC, "ITCnet Common Air Interface", 2013, 46 pages.

Meteorcomm LLC, "ITCR 1.1 System Architecture Specification", Doc Revision: 4.0, Doc No. 00002542-A, 2012, 88 pages.

Progress Rail, "Guardian End-of-Train Device", progressrail.com, Oct. 14, 2020, 2 pages.

Siemens, "Rail Automation, End of Train Device, Locomotive Onboard Equipment", usa.siemens.com/rail-automation, 2015, 2 pages.

* cited by examiner

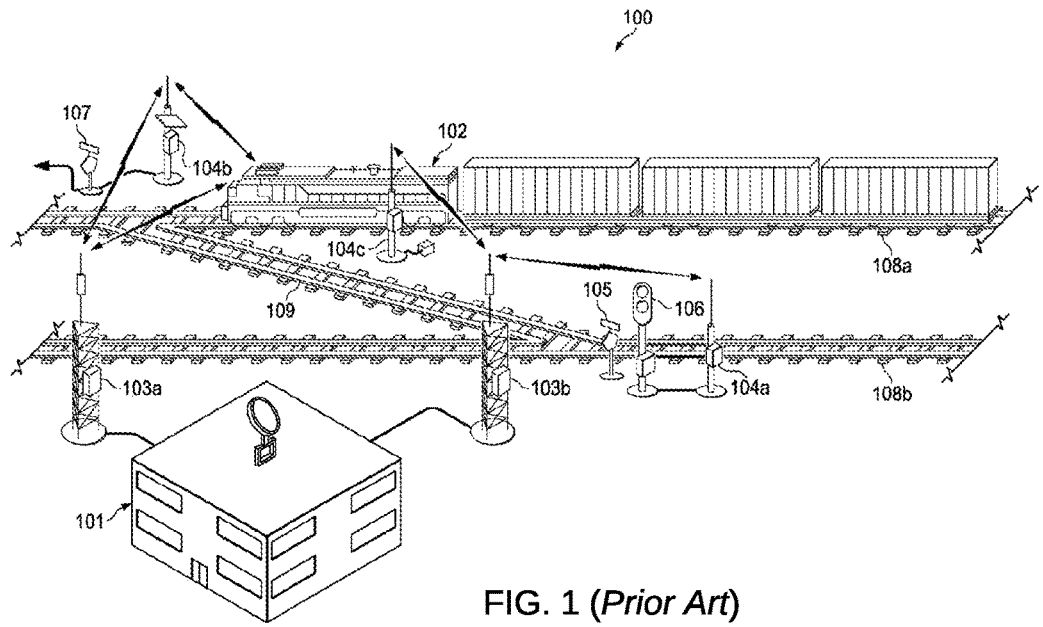
FIG. 1 (*Prior Art*)
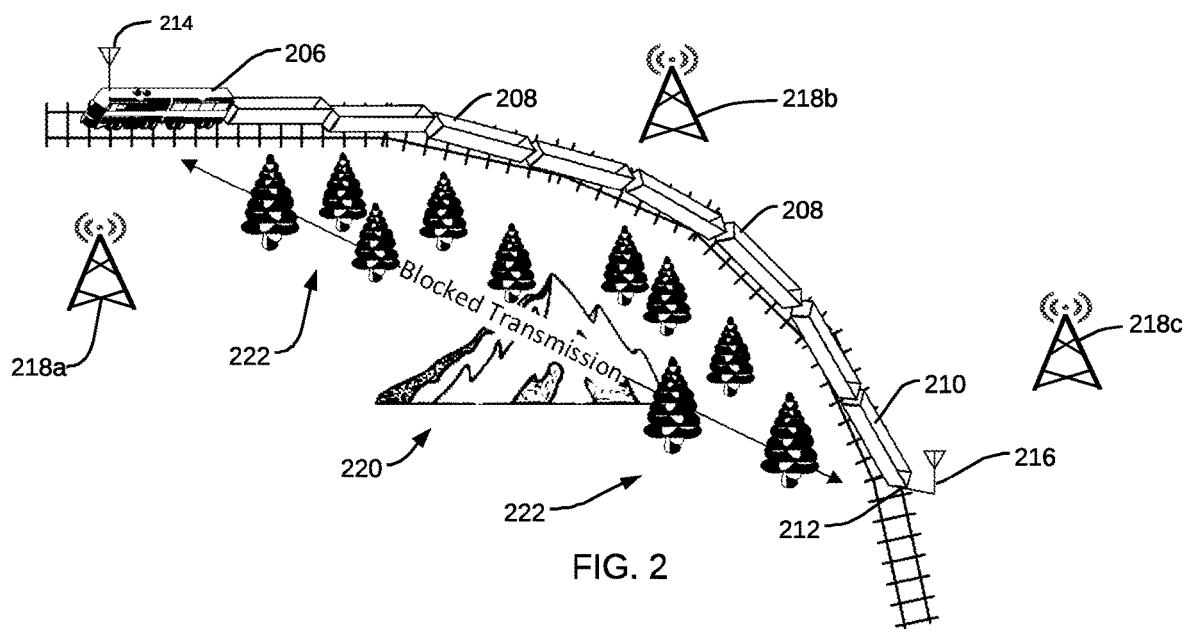
FIG. 2

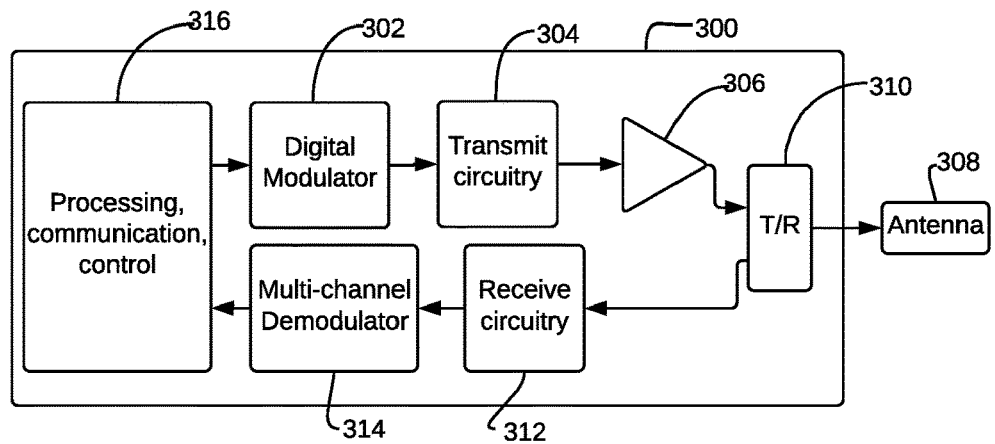
FIG. 3 (*Prior Art*)
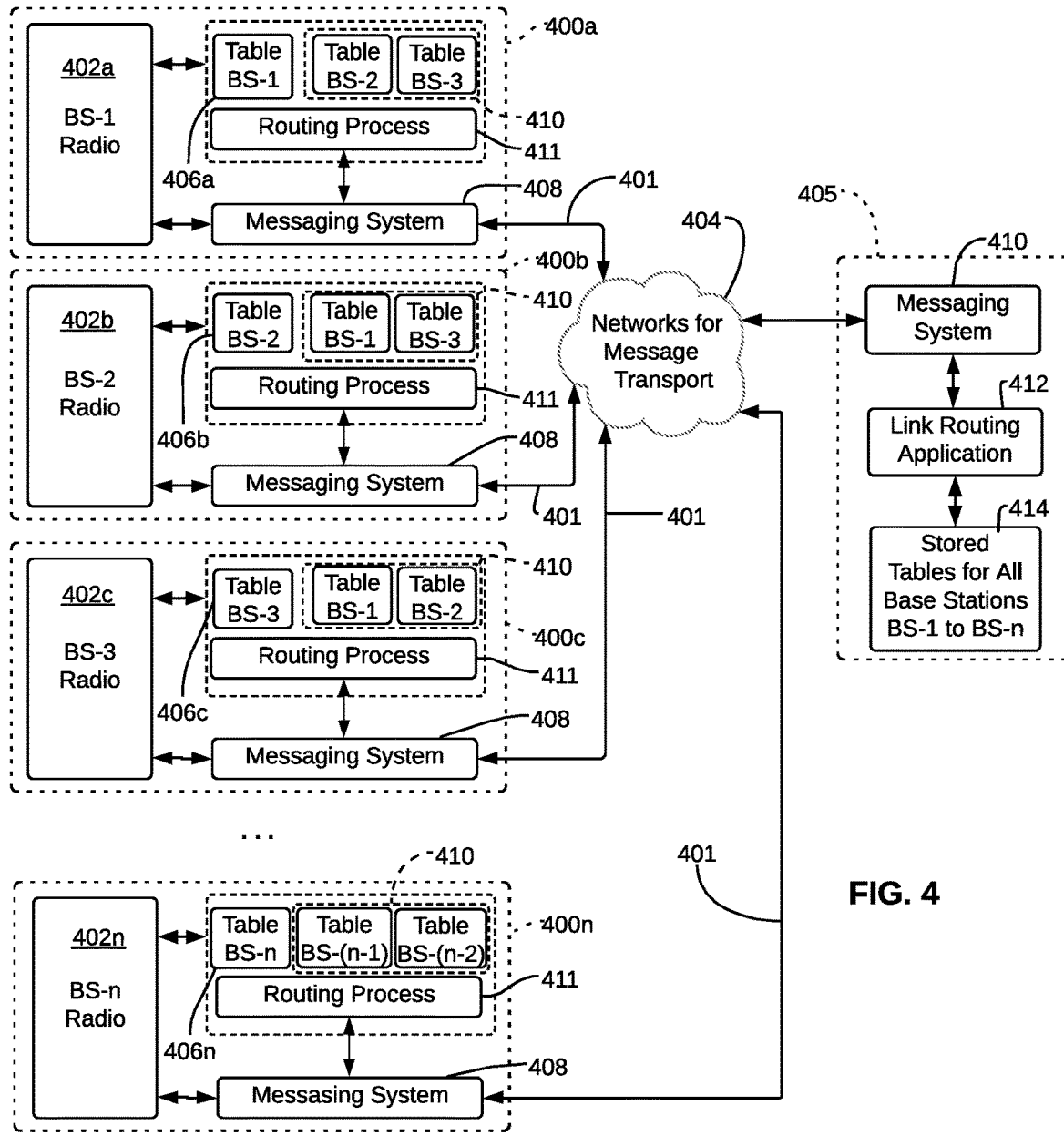
FIG. 4

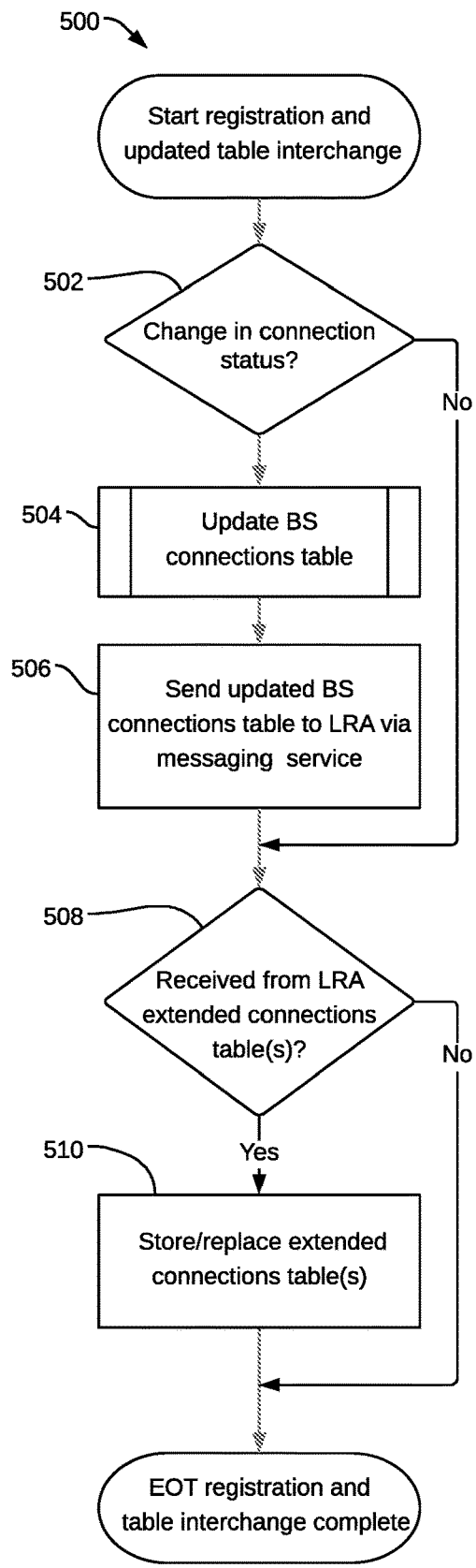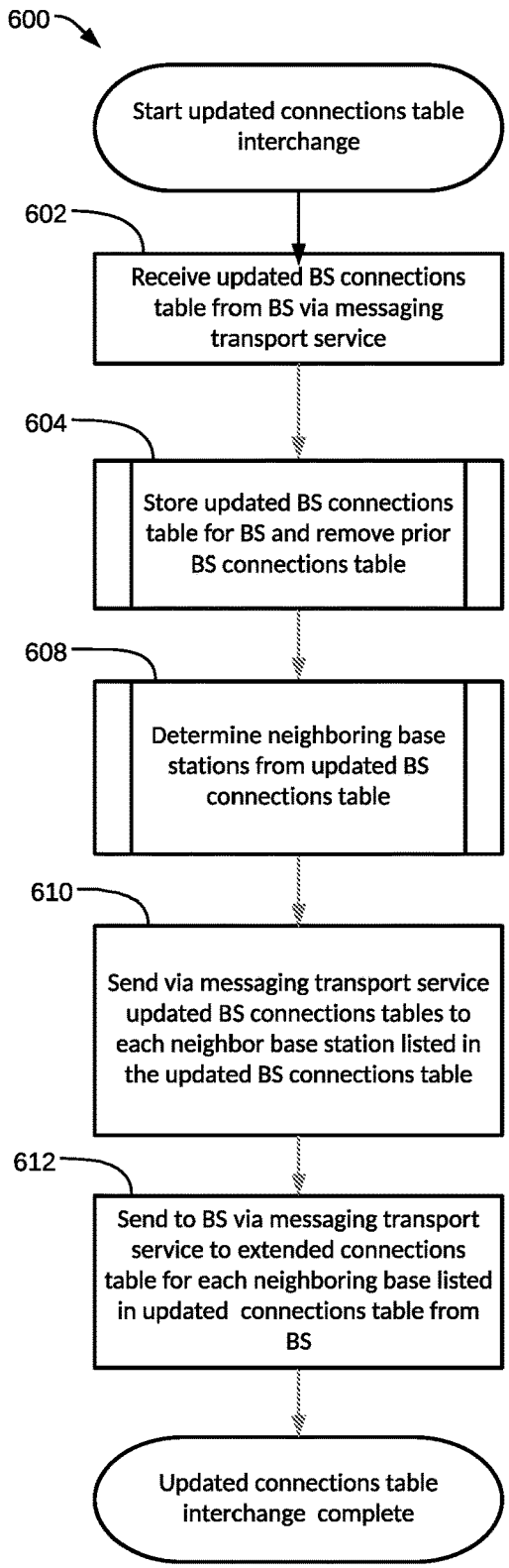
FIG. 5
FIG. 6

END OF TRAIN TO HEAD OF TRAIN COMMUNICATION OVER A TRAIN CONTROL NETWORK

This application claims the benefit of U.S. provisional application No. 63/128,096, filed Dec. 19, 2020, which is incorporated herein by reference for all purposes.

FIELD OF INVENTION

The disclosure pertains generally to railroad train communications systems and particularly to a communications system for use with a railroad train having a head-of-train wireless communications device and an end-of-train wireless communications device.

BACKGROUND

Federal regulations mandate that trains operating under certain conditions have an "end of train" device located on the last car of the train. An EOT device includes a radio that enables the end of the train to transmit and receive signals to and from a radio located in the first vehicle of the train, usually a locomotive, which referred to the head of the train (HOT). The HOT includes computers and other circuits that are used to control the operation of the train and its various subsystems, including the braking subsystem. One of the functions of the EOT unit or device is to monitor the train's braking system pressure at the last car and report it or a loss of pressure to the HOT. If there is adequate pressure at the last car in the train, the cars in front of it will have adequate pressure. Another function of the EOT is to report the geographic position of the last appurtenance attached to the end of the train.

SUMMARY

The signaling between EOT and HOT units is critical and is sensitive to delays or latency. However, there are situations in which direct, radio transmission between EOT and HOT radios becomes unreliable or not possible. This may, for example, occur when the train is long, and it is moving through an area in which terrain or vegetation block or interfere with transmissions.

The following disclosure describes exemplary embodiments for adapting a train control communications network to relay, in effect, communications between end-of-train (EOT) and head-of-train (HOT) radios, particularly in, though not necessarily limited, to situations in which a direct, radio transmission between the EOT and HOT radios is unreliable or not possible.

Trains are capable of moving relatively quickly and can be very long. Thus, the EOT and HOT radios may connect to different base stations in the wireless network and may need to change the base station to which it connects relatively frequently. The train control network is adapted to enable low-latency route determination by a base station when making a forwarding decision for a wireless message received from one of the EOT and HOT radios to the other radio when the EOT and HOT radios are connected to different base stations. A first base station in communication with, for example, an EOT device, receives a wireless data packet containing the signaling information, determines a route to a second base station that is in communication with an HOT radio, and forwards the message to the second base station, which then transmits the message to the HOT radio.

In one, non-limiting and representative embodiment of wireless network for train control adapted for routing messages between an EOT unit and an HOT, each base station maintains a table that lists each base station and remote radio that it hears or can reach ("connection information.") A routing information exchange application or service operating on the train control network facilitates an exchange connection information between neighboring base stations. Base stations send updates to connection information to the service. The service then determines which base stations are neighboring base stations and distributes to each of them a copy of the updated connection information. Using connection information from neighboring base stations that it has stored, a base station is able to quickly build a route for forwarding wirelessly between base stations a data packet that is addressed to a remote radio connected to another base station.

In another embodiment, the connection information for a given base station that is shared contains a list or table of all the radios to which that base station can forward wireless messages. When a base station the updated connection information of a different base station, it replaces all the previously stored the connection information for that base station. When the service receives updated connection information for a base station, it removes the previously stored connection information and sends the updated connection information to each of the other base stations listed in the updated connection information. It then sends to the base station that sent the update the connection information that it has for each of the base stations to which it has sent the updated connection information. This stateless exchange of routing information avoids synchronization errors.

BRIEF DESCRIPTION OF THE DRAWINGS

FIG. 1 is a schematic diagram illustrating components of a train control system.

FIG. 2 is s a schematic drawing of a representative, non-limiting example of a train in which a direct RF connection between an EOT unit and a HOT digital transmitter and receiver is blocked and the EOT unit and HOT connect to a wireless train control network.

FIG. 3 is a schematic drawing of a representative digital packet radio for wireless train control network.

FIG. 4 is a schematic drawing of a representative example of base stations of a wireless train control network with a routing information exchange application operating over a messaging system for use by base stations to forward packets between transient remote radios connected to the base stations.

FIG. 5 is a flow diagram illustrating a representative example of a process at a base station exchanging connection tables with a wireless routing information exchange application of a train control network.

FIG. 6 is a flow diagram illustrating a representative example of a process of a wireless routing information exchange application of train control network.

DETAILED DESCRIPTION OF EXEMPLARY EMBODIMENTS

Figure 7:
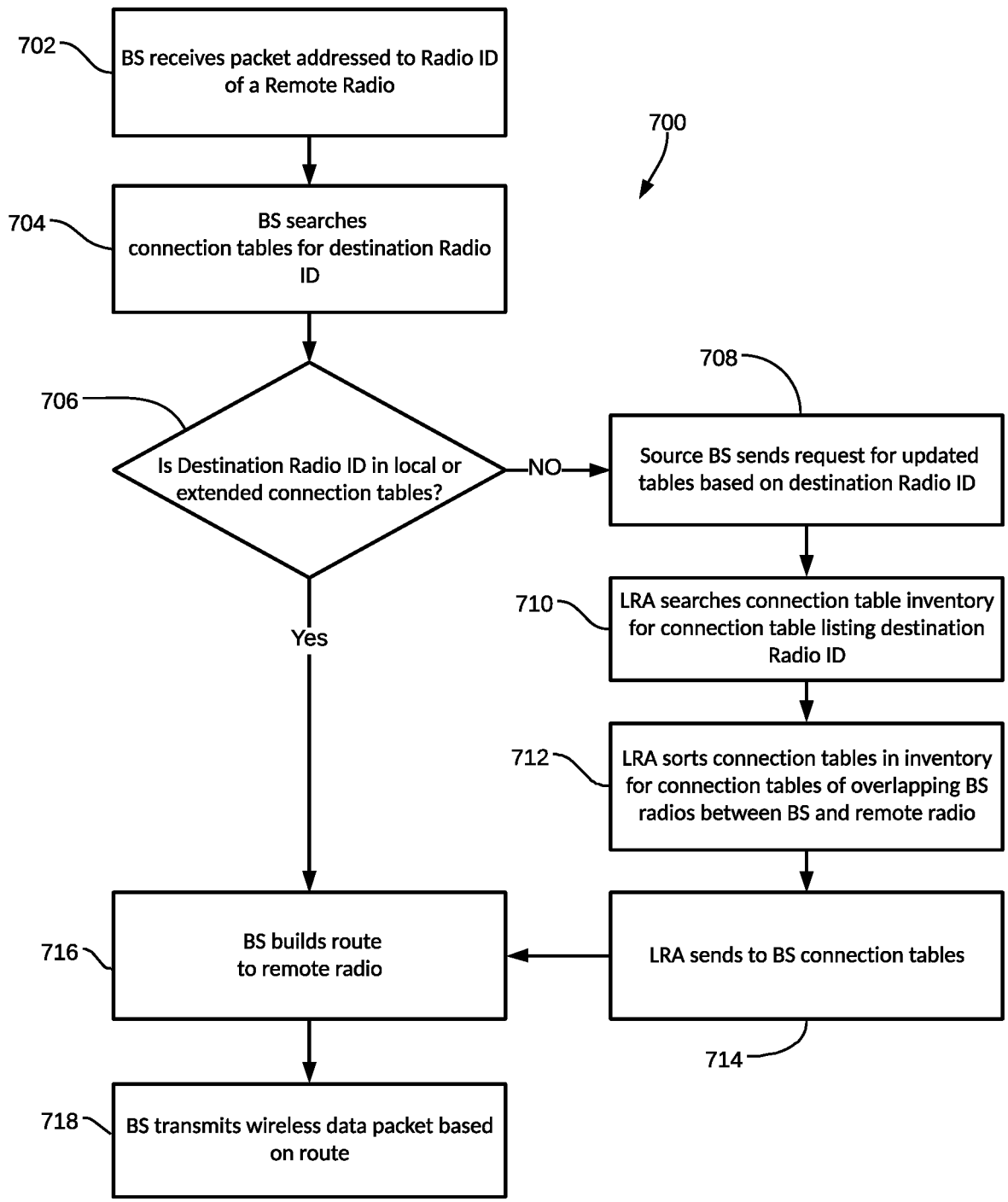
FIG. 7 is a flow diagram illustrating a representative example of processes of a base station and a wireless routing information exchange application for forwarding a packet with application data between remote radios.

In the following description, like numbers refer to like elements.

Railroads in the United States and Canada have implemented centralized traffic control (CTC) systems that enable a dispatcher at a central office or central dispatch office to monitor and control interlockings and traffic flow within a designated territory. "Interlockings" refer generally to signaling arrangement that prevent conflicting train movements through junctions and crossings. A CTC system may also ensure that wayside devices or appliances, such as switches, are properly set before and during a train movement through a track block. In addition to receiving status information from signals and switches, the CTC system may also collect status information from other types of wayside devices, such as rail integrity/track circuits and hazard detectors.

Railroads have also been required by law to implement positive train control (PTC) to prevent train-to-train collisions, over-speed derailments, incursions into established work zone limits, and the movement of a train through a switch left in the wrong position. Like a CTC system, messages in a PTC system rely on wireless communication links to transmit messages between the functional subsystems used in controlling movement on railroads: wayside units, which include crossing signals, switches, and interlocks, for example; and mobile units such as locomotives and other equipment that travel on the railways and their onboard controllers; and dispatch units located in central offices. Each functional subsystem consists of a collection of physical components comprising computers or other types of information processing equipment that are programmed to perform control processes, data storage components for storing databases and other information, and communication interfaces through which messages are exchanged.

Computers running software programs used by a railroad to implement CTC, PTC, and other such "back office" systems rely on a complex collection of interconnected wired and wireless networks to communicate with trains and wayside units. Communication links with trains must be made wirelessly. Various types of wireless networks have been proposed or implemented for this purpose. These wireless networks are also used to connect trains to waysides and other railroad vehicles. They may also link waysides to back office. The wireless networks need to be spread over large geographic areas. They are comprised of radio base stations linked to each other and to back offices by communication links that are usually wired but are not necessarily limited to wired communications links. The base stations are used to establish and maintain wireless communication links with locomotives, service vehicles, and wayside devices and systems operating within the coverage area for the base station.

In the following description, data processes or just "processes" are implemented as one or more programs of instructions that are stored and executed by a computer. A computer is a machine comprising one or more processors or similar hardware that, when executing the instructions according to the program, perform the process. Processors include general purpose processors, special purpose processors such DSPs, and programmed logic circuits such as FPGAs. A computer may also be implemented as a virtual machine or as a compute instance on a cloud computing platform.

FIG. 1 is a high-level, schematic representation of basic functional subsystems or components of a railroad control system. It can be divided logically into four subsystems or segments: back office, locomotive, wayside, and communications. The communications segment connects the other segments for communicating information. It includes both wired and wireless networks and all the infrastructure for providing the connections. In this representative example, the railroad control system 100 supports communications between central offices (CO) or back offices and network operating centers, represented by back office 101, and locomotives 102 and other railroad vehicles located at various points around a rail system, as well as direct communications between locomotives 102 and the electronic wayside monitoring subsystems.

The back office houses computing infrastructure, such as programmed computers, for running various train control applications, such as CTC IPC, and IPTC. The railroad control system 100 also includes a series of wayside monitoring subsystems, which monitor wayside systems such as signals, switches, and track circuits and communicate the monitored information directly to locomotives 102 within the corresponding wireless coverage area, as well as to central office 101, though base stations 103. FIG. 1 shows two representative wayside monitoring subsystems 104a and 104b. As examples of typical uses of wayside monitoring subsystems, wayside monitoring subsystem 104a is shown monitoring a switch 105 and a signal 106, and wayside monitoring subsystem 104b is shown monitoring a hand-throw switch 107. Also, for illustrative purposes, two parallel sections of track 108a and 108b and a connecting section 109 are shown in FIG. 1, which represent only a very small part of the overall track system.

The communications segment is comprised of interconnected networks, including a wireless network comprised of packet data radio base stations dispersed geographically over thousands of miles for enabling connections to locomotives and other mobile units and remote segments such as wayside monitoring subsystems via radio links. The wireless networks are predominantly made up of narrowband networks, which have low-data throughput but high coverage areas. These wireless networks are connected to wired networks at the base station locations or, optionally, 802.11 access points, for backhaul. Broadband wireless networks may also be used, either as substitutes or to extend functionality. However, a narrowband wireless network is preferred for continuous position reporting, data updates, and wayside status communications, where highly reliable, low-latency communication is necessary.

One example of a wireless, narrowband network that supports train control is the ITC network, which was developed Meteorcomm, LLC of Renton, Washington ITCnet® is currently utilized by Class-I railroads, short-line and commuter railroads, system integrators, and Positive Train Control (PTC) hosting providers across the United States for interoperable train control communication. The network supports the exchange of messages for a wide range of applications, such as CTC, IPC, IPTC and other systems used by railways in North America. The ITCnet platform currently in use comprises a 220-MHz radio network (ITCR); a messaging system called ITC Messaging (ITCM) for use by back office applications such as that implement CTC, IPC, and IPTC, and remote devices; and a system management framework called ITCSM. U.S. Pat. Nos. 8,340,056, 8,602,574, and 10,710,620, which are incorporated herein by reference for all purposes, disclose and describe various aspects of communication processes that are implemented by, but not limited to, the ITC network.

FIG. 1 illustrates only two, representative base stations 103a and 103b, each with one or more radios that will be referred to as base station radios. All other radios are "remote radios." Examples of remote radios are those located on locomotives 102 and other railroad vehicles, the radios at waysides, examples of which are wayside monitoring subsystems 104*a* and 104*b*, and other radios geographically separated from back office 101 and which are not radios at base stations 103. "Mobile remote radios" refer to the remote radios disposed on locomotives 102 and other railroad vehicles or any other remote radio that might change location.

Multiple communications paths exist between various communications nodes within the system that support the exchange of different types of information while still meeting all the wireless regulatory requirements imposed by the FCC. A set of communication paths are required for maintaining communications with the fixed remote radios at railroad waysides. In this case, a communication path is required between the radios at waysides 140 and back office 101 for supporting signal system health and status monitoring, centralized control of control points, and wayside defect detector system data and alarms. A further communication path is required between the mobile radios on locomotives 102 and the radios at waysides, which supports wayside status updates provided to locomotives 102 in the proximity of a given set of waysides. The wayside status updates are also forwarded to back office 101. Another communications path is required between the mobile remote radios on locomotives 102 and non-locomotive railroad vehicles and the mobile remote radios on other locomotives and non-locomotive railroad vehicles. This path supports peer-to-peer proximity position reports so that one mobile radio is aware of the locations of nearby mobile radios.

Remote radios and base station radios are digital. They transmit, receive and process information or "data" in a binary digital form, meaning as a series of bits. They are typically implemented using a software defined radio (SDR). A SDR implements certain conventional components such as modulators, demodulators, filters, mixers, etc., using software running on a processer or other programmable hardware circuit, examples of which a digital signal processor (DSP), field programmable gate arrays (FPGA), and general purpose processors. In addition to hardware for executing the processes, an SDR will also have additional hardware, such as memory for storage, radio frequency amplifiers, analog to digital (ADC) and digital to analog (DAC) converters, interfaces, and power supplies. Descriptions of such SDR radios are found in U.S. Pat. Nos. 8,340,056B2 and 8,279,796B1, each of which is incorporated by reference herein for all purposes.

An EOT unit and a HOT each have radio capable of transmitting and receiving wireless data packets to base stations on a wireless network used for train control. An example of such a wireless network uses the ITCnet protocol. A wireless train control network may have a common channel used by all radios and a local channel used by a particular base station radio and remote radios connected to it. The radio for wireless train control network may, optionally, also be used by the EOT and HOT to communicate directly with each other using, for example, a peer-to-peer connection permitted by the wireless train control network or by adapting it to work on a different wireless network. Alternatively, the EOT and HOT may have multiple radios: one for direct communication with each other and one for communication over the train control network.

FIG. 2 schematically represents a small section of track 202 of a railroad with a train 204 comprised of a locomotive 206, which is the HOT, and a plurality of cars 208. Attached to the rear of the last car 210 is an EOT unit 212. The HOT and the EOT unit are each configured to transmit data on at least one radio in the HOT and at least one radio in the EOT unit, which are represented respectively by antennas 214 and 216, capable of connecting to base stations 218 spaced along the railroad that are part of a wireless train control network. Three representative base stations 218*a*, 218*b*, and 218*c* are illustrated. The wireless train control network is, for example, a digital packet radio train control network. An example of this type of network is ITCnet. Digital, binary data is packaged into packets that are transmitted.

The EOT and HOT will normally send information to each other using direct RF transmissions. This could be done using either same digital packet radios used to connect to the base stations 218 or different radios used specifically for onboard RF communication. However, at least situations in situations that affect reception of direct RF transmissions between the EOT or HOT, such as when such transmissions are blocked or degraded by terrain 220 and/or vegetation 222 (e.g., trees), or there is some other type of communication failure, the EOT and HOT are usually still able to connect to one of the base stations 218. communicate via the base stations 218. Because the transmission power of radios used for onboard communication is limited by regulation, simply increasing transmission power may not be an option. In illustrated example, the radio at the HOT can connect to base station 218*a* and the EOT radio is able to connect to base station 218*c*. With the processes described below, a base station serving either the HOT or EOT is able to relay a packet that it receives to the base station serving the other. Thus, in this example, if base station 218*c* receives a transmission from the EOT radio of a data packet addressed to the HOT radio, it is capable of forwarding it to intermediate base station 218*b*. The intermediate base station will then forward it to base station 218*a*, which then forwards it to the HOT radio.

FIG. 3 is a schematic diagram of basic elements found in a representative, non-limiting example of a remote radio 300 that may be used on locomotives and base stations, and that could be adapted for use for wireless communications between an EOT unit and HOT via a wireless train control network. The radio comprises a digital modulator 302 that takes data provided by radio processor 316 that generates a base band signal that is used by the transmit circuitry uses to modulate a carrier signal, which is then amplified by amplifier 306 for transmission by antenna 308. Because the radio is half-duplex (ANSI definition) or simplex (ITU-R definition), a switch 310 determines whether the antenna is connected to the transmit circuitry 304 or receive circuitry 312. When in a receiving mode, signals from the antenna 308 are digitized and down converted by receive circuitry 312 to generate a digital signal that can be demodulated by multi-channel demodulator 314. The resulting data is provided to radio processor 316 for further processing.

Referring now to FIG. 4, which is a schematic representation of a non-limiting, representative example of an implementation of a wireless train control network implementing the processes described below, a wireless segment of a train control network in geographical area, which is schematically represented by wireless links 401, is represented by a plurality of base stations. Individual base stations are designated by reference numbers 400*a* to 400*n*, with the reference number 400 referring to any one or more of them. Each base station 400 includes at least one base station radio. The radios in the base stations 400*a* to 400*n* are referenced respectively by numbers 402*a* to 402*n*, with the reference number 402 referring to any one or more of them.

The train control network further comprises one or more networks 404 that interconnect the base stations with back office applications such as positive train control and many others. Central office 405 is intended to be representative of such back office end points.

The wireless network comprising the base stations 400 and the networks 404 provide transport for messaging service or system that is part of the train control network. The messaging system or service provides end-to-end connection service over one or more transport networks for exchanging messages of an application. In FIG. 4, the messaging system in the figures is represented by messaging system processes 408 at each base station and the back office 405. Each messaging system process is a node that can be an end point for a logical link with another messaging system node. The link provides reliable point-to-point delivery of messages for an application using the train control network over one or more transport networks. The messaging system sets up and manages each link.

In the standard OSI network model, a messaging service operates at layer 4. The messaging system is responsible for transporting messages across one or more transports or networks. A message may be broken into fragments for transport by packets. Processes at the OSI network layer 3 handle source-to-destination packet delivery over the transport network, including routing through intermediate hosts, node connectivity, routing, congestion control, flow control, segmentation, and packet sequencing between nodes. The messages or message fragments from an application are encapsulated in layer 4 headers before being packetized for routing with layer 3 headers for delivery to the address specified in the layer 3 header.

ITCM, which is a non-limiting, representative example of a messaging system, uses Class D messaging, which is described in the Class D Messaging Specification, Standard S-9356, of the Association of American Railroads (AAR.) Each node of the messaging system has an IP address, and each link is assigned a TCP socket at each node when it is set up. A packet received at the node will therefore have an IP header, TCP header, and a Class D header. An application process at each node communicates with an application gateway to set up a link and to exchange messages. It processes the level 4 headers in payloads of data packets received by the radio 300. In ITCnet systems, a connection manager (CM) or external link manager (ELM) performs these functions or processes. A CM or ELM function act as a bridge between the ITC wireless network, particularly the base station radios, on the one hand and, on the other hand, the networks connected to the base station radios, such as the networks used for back haul from the base stations and networks on board trains that interconnect the various onboard systems.

The messaging service of the train control network, such as ITCM, is used as described below to exchange base station connection information, meaning information about what base station and remote radios that a particular base station can hear, is connected with, or otherwise knows about and can communicate directly with.

Each base station radio 402 and remote radio (not shown) has a unique identifier, which will be referred to as a radio ID. The radio ID is a layer 3 network address for packets being sent over wirelessly between radios in the wireless segment of the train control network. For example, a wireless packet will include a layer 1 header, for example a preamble used for packet detection and synchronization and link layer or layer 2 header with link layer overhead. Link layer overhead might include information needed for demodulating and decoding the payload of the packet, the length of the packet, and information about the type of packet. Depending on the type of wireless packet being transmitted, the wireless packet may include in the payload layer 3 network overhead. Layer 3 network overhead may include, among other information, the radio ID of the transmitting radio, the radio ID of the radio to which the wireless packet is being sent (the receiving radio), or both. For a wireless data packet containing user data, the layer 3 overhead will be in the payload along with a user data. The payload may also include layer 4 information if the wireless packet the user data is contains part or all a message that is being transported by the messaging system of the train control network.

Each base station 400 stores at least information about remote radios and the base stations that it hears. An ITCnet base station, for example, maintains a table called a "LINK-STAT" table, which includes the radio IDs of the base stations it hears and the remote radios with which it has a connection. The LINKSTAT also stores additional information. For example, a LINKSTAT table includes the radio ID, RSSI, and distance and bearing information for base stations. Base stations do not currently connect in ITCnet to each other over the air. For each remote radio it maintains a connection. Therefore, the LINKSTAT table includes, for example, the number of ITCnet packets sent and received for each link connection, number of acknowledgements and broadcasts for each link connection, the number of segments and messages for each link connection, the radio ID of the connected remote radio (locomotive, wayside, or MF), relative signal strength indicator (RSSI), distance and bearing (if known), health of the link connection (expected Packets compared to missed packets), link connection duration, and when the link connection was established. Other than the radio ID, this additional information is not required for practice of the processes described below.

A LINKSTAT table is just one example of a collection of connection information containing at least the radio IDs of the radios with which a base station may communicate in the given wireless train control network, including those to which it is connected and those with which it is capable of transmitting to or receiving from wireless packets without a connection. For purposes of the following description, radio IDs for radios that are at least heard by a base station (optionally within a prescribed or determinable time period) and thus located where they might be reached by the base station, as well as those to which the base station is connected wireless, will be referred to as "base station connections" and will be "connections information" for the base station unless otherwise specifically stated. Any collection of information at a base station that includes connection information, regardless of its structure, the way it is stored, and its use will be referred to as a base station "connections table." Each of the plurality of base stations 400 stores a connections table that contains connection information, which includes at least the radio IDs of the remote radios and base station radios with which it is able to communicate. In the case of remote radios, this connection information may include only remote radios with which it has connected. Maintaining only information on wireless remotes that have connected to the base station offers some advantages, as described below. Thus, a first base station 400*a* has a connection table 406*a*, which is labelled as "BS-1." A second base station 400*b* has a connection table 406*b*, which is labelled as "BS-2." A third base station 400*c* has a connection table 406*c*, which is labelled as "BS-3." An nth base station 400*n* has a connection table 406*n*, which is labelled as "BS-n."

A base station will hear from a remote radio when it receives a packet from one that includes its radio ID. One reason for a remote radio to send a packet addressed to a base station is to establish a connection with the base station. One purpose for connection is to maintain a relationship that tracks the state of the communication between the base station and the remote radio for purposes of ensuring reliable wireless packet delivery. Such a connection is necessary for setting up a link for a messaging service. In ITCnet, for example, remote radios send packets to a base station with which it wants to connect for purposes of establishing a link for sending or receiving messages using ITCM. A persistent, stateful connection is required to establish a link for transporting messages of a messaging system. However, alternatively or in addition, a remote radio could send a packet with the radio ID of the remote radio to a base station to register with base station but not establish a stateful connection and/or to set up a link for the messaging system. A base station could track such registrations in its base station connections table. This would allow a base station to track remote radios within its range, to which it could attempt to transmit data packets it receives that are addressed to it. A connectionless registration could be, for example, implemented, by requiring that remote radio sending to the base station a wireless packet containing its radio ID that is of a certain, predefined type or triggered by merely receiving a wireless packet (which could be a broadcast packet or a unicast packet to the base station) from a remote radio containing its radio ID as a source address. A connection or a connectionless registration of a remote radio with a base station may, optionally, time out and be removed from the connections table after expiration of predefined period of time since a wireless packet was last received from the remote radio.

The coverage areas for the base stations 400 will normally overlap. Each base station will therefore be able to "hear"— meaning to receive RF signals transmitted by—one or more other base stations in the vicinity. These other base stations are referred to as neighboring base stations. A base station normally broadcasts packets to inform all radios in the vicinity—remote radios and base station radios—about the base station. These particular types of broadcasts are transmitted on a designated "common" channel that all base station and remote radios tune to. These broadcast packets advertise information about the base station, including how to connect to it on one or more "local" channels that are assigned to the base station and used by the base station and remote radios connected to it to communicate.

For the following description, a "remote radio" will refer to a radio at either the HOT or in the EOT unit that is adapted to connect with a base station or other access points in a wireless train control network. A remote radio may, but is not required to, have additional capabilities, and be used for other purposes or by other systems to communicate. An "EOT/HOT radio" refers to radios used in the EOT unit and HOT for direct RF communications between if remote radios are not being used for direct RF communication in, for example, using a peer-to-peer connection.

As previously discussed, when direct RF communications between the EOT and HOT are lost or not reliable due to RF channel degradation or, if EOT/HOT radios are being used and one fails, the EOT/HOT application in each of the EOT unit and the HOT is configured to send information via the wireless segment of the train control network. When one of the HOT and EOT remote radios sends EOT/HOT application signals or data to the other, it is sent as part of the payload of a wireless data packet according to the protocol of the wireless train control network to a base station, which is then responsible for delivering it to the other remote radio.

As a train moves along a track, the remote radio in the EOT unit and the remote radio in the HOT may each register with one of the plurality of base stations 400. The remote radios could register with the same base station or with different base stations. Which base station a remote radio picks depends on the protocols used by the wireless train control network. It could be the one that is closest or the one that has the strongest signal. A remote radio will switch its connection to a new base station as the train moves by registering with another base station. When it does is determined by the wireless segment protocols.

Registration comprises sending a wireless packet to a base station that contains the radio ID of the remote radio. The registration may result in either a connectionless registration, such as the one described above, or a connection with the base station. The base station then stores the radio ID its connections table. This indicates that the base station can reach the remote radio.

For a wireless train control network like ITCnet, the HOT will normally include a remote radio used for train control communications that always maintains a connection with a base station. This remote radio could also be used for EOT/HOT communication. The remote radio in the EOT unit may, optionally, register with a base station when direct RF communications between the EOT and HOT are lost or not reliable due to RF channel degradation or a problem with one or both EOT/HOT radios. Alternatively, the remote radio in the EOT unit can always remain connected to a base station.

In the example of ITCnet, a remote radio will register with a serving base station by requesting the base station to connect. The connection is made by the remote radio sending an "Acquire" packet to the base station. This initiates a connection set up process at the base station that establishes a link between the base station and the remote radio. A connection in a wireless train control network like ITCnet usually includes assignment of a transmission slot in a multiple access scheme. However, a connection is not required to carry HOT/EOT data messages. In ITCnet, it is used to create an entry in the LINKSTAT table.

When remote radios of the EOT and HOT are connected to the same base station, each remote radio radios can send EOT/HOT application data to the other in wireless data packets with the radio ID of the other remote radio. The base station will transmit the user data in another wireless data packet in a manner such that it can be received by remote radio to which it is addressed. However, if the remote radios are connected to different base stations, the base station that receives a wireless data packet with application data addressed to a remote radio that it does not know the location of, it must determine where it is and a route for forwarding it. This process at each of the plurality of base stations 400 is represented by routing processes 411. In one embodiment, a base station dynamically determines or builds a route using connection tables from neighboring base stations. Once built, the route can, optionally, be stored in, for example, a forwarding table for quick look up if needed again. Because the remote radios are assumed to be mobile and their connections transitory, any previously built and stored route should, but does not have to be, be discarded after a relatively short period and/or a change in radios that are heard by or registered with the base station radio or a change or update to the extended connection tables.

FIG. 5 illustrates the base steps of a table exchange process 500 is executed on a computer within each base station. With reference to FIGS. 4 and 5, as represented by decision step 502, when a new remote radio registration or deletion of a previous registration of a remote radio (or at least one involving addition or removal of a registration of a remote radio being used for EOT/HOT communications) causes at step 504 the base station to update or change the connections information that it stores, it sends an updated connections table to a link routing application or "LRA" at step 506.

The LRA comprises processes that distribute radio connection information maintained by each of the stations 400a to 400n to a subset of the remaining base stations for purposes of enabling each base station to build quickly a route that allows the wireless segment to relay data between transient remote radios that do not have a direct RF connection as they move through the geographic territory covered by the wireless segment.

The LRA system or application is comprised of a least one central process performed by or running one more computers at one or more central offices, represented by LRA application process 412, and the routing process 411 operating at each of the base stations. The base station process can, for example, be implemented as part of a protocol stack that also implements the local messaging system process 408. Each of the processes is implemented by stored software programs running on a computer. Multiple instances of the LRA central process may exist for redundancy or load distribution or for serving different territories covered by the train control network. The base stations 400 use the messaging system 408 to exchange radio connection information with the LRA.

As indicated by steps 508 and 510, a base station may also receive from the central process of the LRA connection tables from one or more t neighboring base stations. These connection tables will be referred to as "extended connection tables" to distinguish them from a base station's connections table. The extended connection tables 410 are stored by each of the plurality of base stations 400. In the example shown in FIG. 4, base station 400a stores has its own connection stable 406a ("Table BS-1") as well as extended connection tables 410 comprising "Table BS-2," which is the connection table for the BS-2 radio 402b of base station 400b, and the connection table "Table BS-3" for the BS-3 radio 402c of base station 400c.

Referring now also to FIG. 6, which illustrates the basic steps of a process 600 that the link routing application 412 performs when a base station sends a new or updated connections table via the messaging system. When the new or updated connections table is received from a base station 400 at step 602, it stores at step 604 the received connections table in data store 414 and removes any previously stored connections table for that base station. Other base stations in in the connections table of the base of the station are identified as neighboring base stations. At step 610, the new or updated connections table is sent to each of the neighboring stations via the messaging system at step 608, each of the neighboring storing it in its store of extended connections tables 410. At step 612, the LRA returns to the base station that sent the new or updated connections table the connections table (or subset of it listing all the connections in format that can be directly used by base stations to build routes but omitting any unnecessary information) of each neighboring base station.

Alternatively, updates to connection tables could be made incrementally by distributing only update portions of tables or, for example, only returning to the base station connection tables from neighboring base stations that were not previously distributed to the base station. However, such a process requires careful tracking of the state of the distribution. The stateless exchange of base station connection tables (or exchange of the complete connection with unnecessary data or information removed) avoids the complexity of incremental updates and the possibility of conflicting updates and other errors and difficulties arising from synchronizing the tables. Furthermore, connection tables are usually small enough to allow for an entire connection table to be sent.

Furthermore, the connections table for each base station is, in one embodiment, a table of links, such as the LINK-TAT table, that a base station uses for setting up and tracking links or connections with radios. Alternatively, it can be a subset that of that information that contains, for example, identifiers for the remote and base station radios that are at least hears, such as Radio IDs, and, optionally, additional information that might be required or helpful for exchanging connections information and building routes and unnecessary information removed. A base station may, for example, maintain and use a table of links like the LINKSTAT table, and rely on it when building routes, generating a subset of it to the LRA for distribution to other base stations when there is a change in connection information. It may, alternatively, keep a copy of it for using in building routes. As another alternative, the entire table of links could be sent to the LRA as the connections table, which then generates a subset connections information that is stored and distributed as extended connection tables. References to a "connections table" is intended to encompass each of these options.

Process 700 in FIG. 7 illustrates steps of processes at a base station and the LRA when base station, for example base station 400a (FIG. 4), receives from a remote radio at step 702 a wireless data packet with a payload or message containing application data—EOT/HOT application data in this example—destination radio ID. The wireless data packet can be received from a remote radio that originates it or from another base station. In this representative, each source base station independently and dynamically builds a route to the destination remote radio. To do this, it needs to know which base station it is registered with. At step 704, the base station looks up the destination radio ID in the network or layer 3 overhead in the received packet in its connection table 406a and the extended connections tables that are in its store of extended connection tables 410. If it at step 706 finds the radio ID, a routing process at the base station builds a route to the destination remote radio at step 718 and then constructs and transmits per the route a wireless data packet that forwards at least the application data and includes network layer overhead with the destination radio ID. If the remote radio with the destination radio ID is connected to the base station, the route is the base station that received it. That base station then transmits it to the remote radio as, for example, a unicast message on a local channel, or, possibly, as a long broadcast message on the common channel or as a long broadcast message on a direct RF channel(s).

If the destination remote radio is not connected to the base station, the route to the destination remote radio will be a path through one or more base stations. The route will designate the next hop base station. The base station constructs and transmits a wireless packet with at least the radio ID of the destination remote radio and the application data in a manner that, under the protocols of the wireless train control network, will be received by the next hop base station. This wireless data packet could be sent over a wireless link established between base stations. However, a link is not required. A connectionless transmission can be used. In one example, the base station broadcasts or unicasts the wireless data packet on a common channel that the base stations share. If there is a direct RF connection between the base stations, the wireless data packet can be sent over that connection.

In the example of ITCnet, a base station will forward a wireless data packet to another base station using a broadcast on the common channel or a direct RF channel, which use a carrier sense multiple access (CSMA) scheme. Alternatively, if supported, the wireless data packet could be sent as a unicast message a link connection over the common channel.

Wireless links or connections between base stations and using the messaging system of the train control network for end-to-end transport of the EOT/HOT application data could be used in the alternative. However, using the wireless segment without a connection has lower latency as compared to wireless link or connection due to the overhead to set up the link. It also has much lower latency than using the messaging system (either over the wireless link or the wired network connecting the base stations). Using connectionless forwarding makes the fail-over process in the event of an interruption a direct RF connection between EOT and HOT relatively quick and easy.

If, at step 706, the destination radio ID is not in the base station's connections table or extended connection tables store 410, the base station sends at step 708 a message with a request to the LRA 412 with the destination remote radio's radio ID. This message is sent using the messaging system 408. At step 710, the LRA searches its inventory in data store 414 of connection tables for one with the destination Radio ID. It also determines at step 712 the inventory of connection tables for base stations overlaps between the target base station and the base station that sent the request based on the base station radios that are listed as being heard in the base station connection tables. It returns the connection tables for the target base station and the overlapping base stations to the base station that made the request at step 714 as extended base station tables. These extended tables can then be used at step 716 to build a route to the destination remote radio.

In an alternative embodiment, connection tables could be exchanged between base station using the wireless segment. The LRA determines which base stations overlap by examining which bases station are in in the connection tables reported by each of the base stations. To exchange each base station's connection tables would create a time delay in building routes similar in nature and cause to the delays associated with building packet routes using more familiar and common protocols, such as the X.25 protocol. Using the LRA as a central clearing point, with unsolicited updates from base stations allows for nearly instantaneous route building because the base station retains the routing information—the extended connection tables—after receiving them from the LRA. The query to the LRA at step 708 is a fail-positive in the event that the base station must handle a new route to the destination remote radio before the LRA has sent to the base station an updated connection table for the base station serving the destination remote radio. It is expected that, in most case, the base station will have already received the LRA an updated connection table with the destination remote radio's ID. In the event of a reset of a base station radio 402, the base station 400 could query the LRA, if needed, to re-establish a route more expediently.

The foregoing description is of exemplary and preferred embodiments. The invention, as defined by the appended claims, is not limited to the described embodiments. Alterations, substitutions, and modifications to the disclosed embodiments may be made without departing from the invention as claimed.

What is claimed is:

1. In a wireless train control network comprising
   a plurality of base stations in a territory interconnected by one or more networks for enabling communication between each of the plurality of base stations and one or more central offices,
   each of the plurality of base stations comprising at least one base station radio,
   a method of routing data packets between a plurality of remote radios on board a train, the method comprising at each base station of the plurality of base stations:
   sending, to an automated table exchange process running one or more computers associated with the one or more central offices, a connections table comprising connection information with an identifier for each remote radio of the plurality of remote radios and each heard base station radio;
   receiving, from the automated table exchange process, an extended connections table for each of the heard base station radios, the extended connections table containing connections information received by the automated table exchanged process from the base station with which each of the heard base station radios is associated;
   in response to receiving a data packet transmitted wirelessly by a first remote radio of the plurality of remote radios that is addressed to a second remote radio of the plurality of remote radios, building a route for forwarding the data packet to the second remote radio based on the connections table and the extended connections tables;
   transmitting wirelessly the data packet to another of the plurality of base stations according to the route for forwarding to the second remote radio.

2. The method of claim 1, wherein building a route further comprises determining from the connections table and the extended connections tables which of the plurality of base stations the second remote radio is connected to and determining a route to that base station.

3. The method of claim 2, wherein, in response to determining that the identifier second remote radio is not in the connections table or the extended connections tables, the base station sends a request to the automated table exchange process with the identifier of the second remote radio; the base station receives in reply an extended connections table for the base station radio containing connections information with the identifier of the second remote; and the base station builds the route with based on the extended connections table for the base station radio containing connections information with the identifier of the second remote.

4. The method of claim 3, wherein, in reply to the request, the base station further receives one or more extended connections tables for overlapping base station radios.

5. The method of claim 1, wherein the connections table is table used by the base station to maintain links between the base station and remote radios connected with it.

6. The method of claim 5, wherein the extended connections table received by the base station from the automated table exchange process are connections tables received by the automated table exchange process from other base stations in the plurality of base stations.

7. The method of claim 1, wherein each base station, in response to a change in the connections information in its connections table, sends an updated connections table to the automated table exchange process and, in response, receives from the automated table exchange process an extended connections table for each of the heard base station radios identified in the updated connections table.

8. The method of claim 1, wherein one of the first and second remote radios is connected to an end of train (EOT) unit at the end of a train and the other of the first and second remote radios is at a head of the train (HOT), and wherein the data packet contains EOT to HOT signals.

9. The method of claim 1, wherein the one or more networks are configured for transporting messages via a messaging service between each of the plurality of base stations and the automated table exchange; and the connections table and extended connections table are exchanged between the plurality of base stations and the automated table exchange process as messages.

10. The method of claim 9, wherein the messaging service operates according to the Interoperable Train Control Messaging (ITCM) protocol.

11. The method of claim 1, wherein the remote and the base station radios are adapted to transmit and receive wireless data packets according to an Interoperable Train Control Network (ITCnet) protocol.

12. An automated method of exchanging routing information between a plurality of base stations of a wireless train control network for building routes to forward wirelessly data packets transmitted between remote radios,
the plurality of base stations being interconnected by networks configured for transporting messages between the base stations and one or more computers executing stored programs for performing the automated method at one or more central office,
each of the base stations comprising at least one base station radio for which it maintains a connections table containing connection information, the connection information comprising an identifier for each base station and a remote radio of a plurality of remote radios that it hears; the method comprises:
receiving, from a first base station of the plurality of base stations, a first connections table maintained by the first base station containing first connections information for the first base station;
storing the connections information in a data store containing connections information for each base station of the plurality of base stations;
sending, to the first base station for each base station radio identified in the first connections information, an extended connections table containing connections information for the identified base station radio; and
sending, to each base station with a base stations radio identified in the first connections information, the extended connections table with the first connections information of the first base station.

13. The method of claim 12, wherein, in response to receiving a request from the first base station with the identifier of a remote radio,
determining from the data store a second base station in the plurality of base stations listing the remote radio identifier in its connection information;
sending to the first base station the extended connections table for the second base station.

14. The method of claim 13, further comprising in response to receiving a request from the first base station with the identifier of a remote radio determining from the data store of connections information one or more overlapping base stations and sending to the first base station extended connections tables for each of the one or more overlapping base stations.

15. The method of claim 12, wherein the connections table of each base station in the plurality of base stations is a table used by the base station store a state for each wireless link between the base station and a remote radio connected with it.

16. The method of claim 15, wherein the extended connections table sent to the first base station are connections tables received from other base stations in the plurality of base stations.

17. The method of claim 12, wherein, in response to receiving an updated connections table with update connection information from the first base station, sending an extended connections table for each base station radios identified in the updated connections table.

18. The method of claim 12, wherein the remotes radios comprise at least two of the remote radios, of which is part of an end of train (EOT) unit at the end of a train and the other is at a head of the train (HOT), each of which is transmitting to a different one of the plurality of base stations data packet contains EOT to HOT signals.

19. The method of claim 12, wherein the one or more networks are configured for transporting messages via a messaging service between each of the plurality of base stations and the automated table exchange; and the connections table and extended connections table are exchanged between the plurality of base stations and the automated table exchange process as messages.

20. The method of claim 19, wherein the messaging service operates according to the Interoperable Train Control Messaging (ITCM) protocol.

21. The method of claim 12, wherein the remote and base stations radios are adapted to transmit and receive wireless data packets according to an Interoperable Train Control Network (ITCnet) protocol.

* * * * *